United States Patent [19]

Ball et al.

[11] Patent Number: 4,583,912
[45] Date of Patent: Apr. 22, 1986

[54] DAMPED DYNAMIC VIBRATION ABSORBER

[75] Inventors: James H. Ball; Pradip N. Sheth; Keith E. Rouch, all of Milwaukee, Wis.

[73] Assignee: Allis-Chalmers Corporation, Milwaukee, Wis.

[21] Appl. No.: 590,413

[22] Filed: Mar. 16, 1984

[51] Int. Cl.$^4$ .................................... F04D 29/66
[52] U.S. Cl. .................... 415/119; 74/574; 74/573 F; 417/424; 464/85; 464/92
[58] Field of Search ............ 415/119, 500, 501; 74/573 F, 574; 464/85, 92, 93, 180, 76.20; 188/272, 279, 280; 267/141, 136, 140.1; 417/424

[56] References Cited

U.S. PATENT DOCUMENTS

| | | | |
|---|---|---|---|
| 2,914,081 | 11/1959 | Bigham | 417/424 |
| 3,160,584 | 12/1964 | Hunter | 74/574 |
| 3,172,850 | 3/1965 | Englesberg et al. | 417/424 |
| 3,446,155 | 5/1969 | Guth | 417/424 |
| 3,995,513 | 12/1976 | Admall et al. | 74/574 |
| 4,044,626 | 8/1977 | Hayashi et al. | 74/573 F |
| 4,433,592 | 2/1984 | Tatsumi et al. | 74/573 F |

Primary Examiner—Edward K. Look
Assistant Examiner—John Kwon
Attorney, Agent, or Firm—Timothy R. Conrad; Arthur M. Streich

[57] ABSTRACT

A pump is disclosed having a damped dynamic vibration absorber for attenuating pump vibration in response to a periodic disturbing force generated when the pump is in operation. The vibration absorber comprises elastic means, an annular mass and an energy dissipative means. The elastic means are arranged around the pump in a plane generally normal to the axis of rotation having one end secured to the pump and one end free to vibrate relative to the pump. The annular mass is secured to the free end and the energy dissipative means comprising a squeeze film damper is secured to the annular mass. The annular mass has a predetermined mass, and the elastic means have a predetermined stiffness and the squeeze film damper has a predetermined damping ratio such that the absorber generates a compensating force acting on the pump out of phase with a periodic disturbing force which acts on the pump and is generated while the pump is operated. The effect of the compensating force is to attenuate vibration of the pump which would otherwise occur as a result of the periodic disturbing force.

16 Claims, 23 Drawing Figures

DAMPED DYNAMIC VIBRATION ABSORBER

CROSS REFERENCE TO RELATED PATENT APPLICATION

This application discloses an apparatus for attenuating vibration of a pump which is related to our copending and assigned U.S. patent application Ser. No. 590,334, "Damped Vibration Absorber", filed concurrently with this application.

BACKGROUND OF THE INVENTION

1. Field of the Invention

This invention relates to a damped dynamic vibration absorber and more particularly to a damped dynamic vibration absorber to attenuate the lateral vibration of a pump which in operation has either fixed rotational speeds or a range of rotational speeds.

2. Description of the Prior Art

Apparatus such as pumps experience certain disturbing forces during their operation. For example, an imbalance of the rotational elements may result in disturbing forces acting on the pump bearings. Also, as the pump impeller rotates within the pump volute, a broad band hydraulic disturbing force is generated having periodic components which, in the case of a pump, have frequencies proportional to the rotational speed of the pump impeller. If the pump installation has a natural or resonant frequency near the frequencies of the disturbing force, the pump can begin to vibrate with sufficient amplitude to either cause objectionable noise and vibration of the pump equipment or damage the pump equipment or damage the pump support structure, or all three of the preceding. In the case of a pump having a range of operating rotational velocities, the problem of vibrations is compounded where the pump has multiple resonant frequencies within the range of frequencies of the periodic disturbing force.

There are several known solutions to attempt to attenuate vibration of a pump. However, in many instances, these solutions are impractical, aesthetically displeasing or uneconomical. For example, one solution may be to build a structure around the pump apparatus to tie to the apparatus to prevent vibration. However, available space or cost constraints may prohibit the additional construction of support apparatus and ties. Also, vibration may be reduced by greatly increasing the mass of the pump. However, such a solution is often uneconomical.

This invention contemplates a provision of a damped dynamic vibration absorber, or a number of such absorbers secured to the pump apparatus and tuned to have a natural frequency and damping ratio sufficient to attenuate vibration of the pump apparatus throughout the operating range.

Tuned vibration absorbers are in principle well known. For example, U.S. Pat. No. 4,150,588 to Brewer, issued Apr. 24, 1979, teaches an undamped vibration absorber to attenuate vibrations of an exhaust fan having a single operating speed. In the problem addressed by Brewer, the fan had a resonant frequency near the operating speed. While the teachings of Brewer may be acceptable for an apparatus having a single operating speed, it is not applicable to attenuate vibration of an apparatus having an operating speed over a wide range with multiple resonant frequencies within the operating range. Furthermore, the apparatus as taught by Brewer is tuneable to a single frequency. It is not effective at other frequencies which would be desirable for an apparatus having a wide range of operating speeds. For example, it may be desirable to tune a vibration absorber to be effective at any one of the following:

a. A frequency of a disturbing force;
b. A resonant frequency of the pump system;
c. A frequency that attenuates the displacement within a frequency range; and
d. Two resonant frequencies of the pump installation.

Theories for applying the above tuning techniques to mathematically modeled systems are generally known. For example, Den Hartog, *Mechanical Vibration*, Fourth Edition McGraw-Hill (1956) teaches a theory for tuning an absorber to a resonant frequency for a mathematically modeled single degree of freedom system. Lewis, F. M. "Extended Theory of the Viscous Vibration Damper", *Journal of Applied Mechanics*, ASME Transcripts, Volume 22, pages 377-382 (1955) teaches a theory for tuning an absorber for a multi-mass modeled system. For the theory of tuning an absorber to a lowest structural response in a frequency range with multiple resonances, the following article discusses the problems in terms of mathematically modeled systems: Kwak, B. M., et al "Optimum Design of Damped Vibration Absorber Over a Finite Frequency Range" *AIAA Journal*, Volume 13, page 540 (April 1975). Tuning to two resonant frequencies of a multi-resonance structure is theoretically described in McMunn, J. C. et al "Multi-Parameter Optimum in Linear Dynamical Systems" ASME, Design Engineering Vibration Conference, March 1969.

While the mathematical theory of vibration absorbers is generally well developed, in practice as noted by Brewer, there are many difficulties in designing and constructing a tuned vibration absorber for particular applications. Indeed, the problem is particularly highlighted in the case of a pump which is a multi-degree of freedom apparatus and has multi-resonances within an operating range.

OBJECTS AND SUMMARY OF THE INVENTION

It is an object of the present invention to provide a vibration absorber which attenuates vibration for an apparatus having rotary elements which operates within a predetermined speed range.

It is a further object of the present invention to provide a pump having a vibration absorber which is provided with a predetermined mass, stiffness and damping ratio to attenuate lateral vibration of the pump over a predetermined operating range.

According to a preferred embodiment of the present invention, there is provided a vertical centrifugal pump having a damped dynamic vibration absorber for attenuating pump vibrations. The vibration absorber comprises plurality of elastic means rigidly secured to the pump apparatus. The elastic means are arranged around the rotational axis of the pump in a plane generally normal to the axis. An annular mass is secured to each of the elastic means with the mass generally concentric with the axis of rotation normal to the axis. The absorber includes energy dissipative means comprising a squeeze film damper which is carried by the annular mass. The annular mass has a preselected mass, the elastic members have preselected stiffness and the squeeze file damper has a preselected damping ratio such that the absorber generates a compensating force acting on the pump out of phase with a periodic force to attenuate vibration of the pump which would otherwise be caused by the periodic disturbing force.

DESCRIPTION OF THE PREFERRED EMBODIMENT

Figures 1, 2, 3:
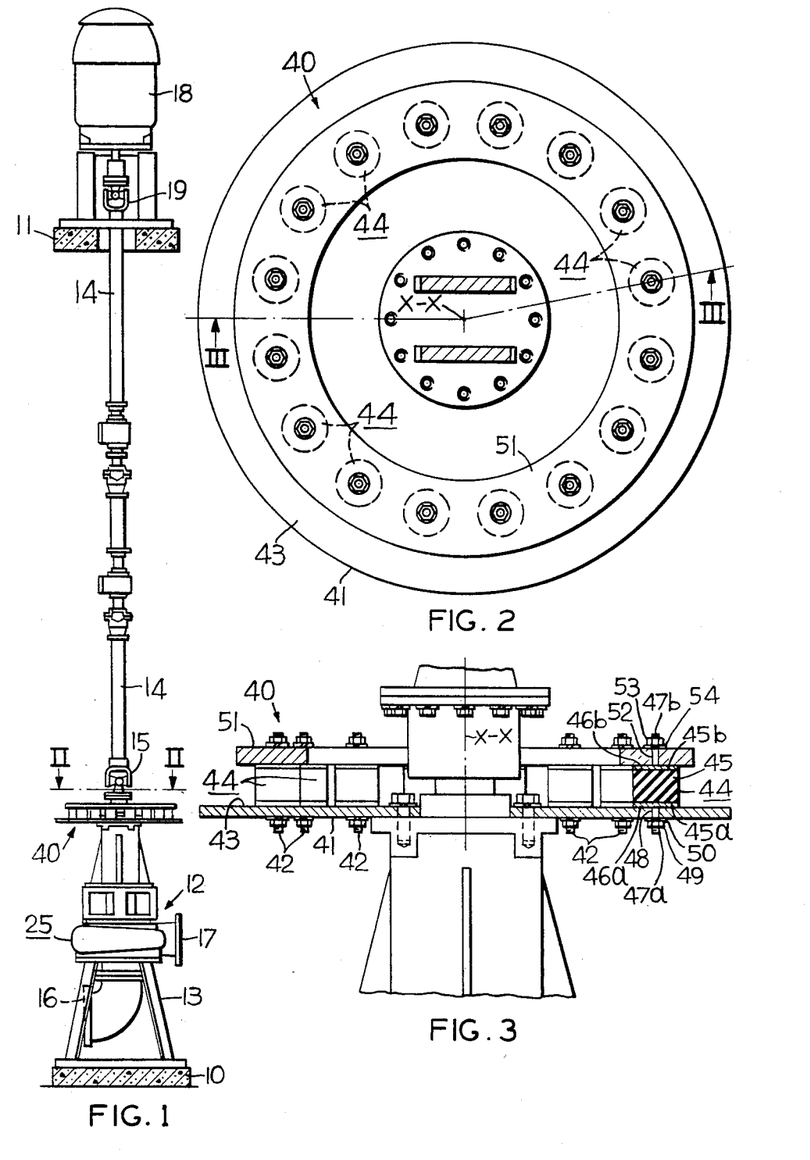
FIG. 1 is an elevation view of a pump installation.
FIG. 2 is a view taken along line II—II of FIG. 1.
FIG. 3 is a view taken along line III—III of FIG. 2.

Referring to FIG. 1, a pump installation is shown having a floor foundation 10 and an upper foundation 11. The installation includes a pump 12 supported by a stand 13 with the stand rigidly secured to the foundation 10. The stand 13 supports the pump 12 such that the pump's rotating elements (shown in FIG. 18) rotate about a vertical axis coaxial with a line shaft 14 which is connected by means of a coupling 15 to the rotating elements of the pump. The pump includes an intake 16 and a discharge 17. The shaft 14 is operably connected to a motor 18 by means of a coupling 19. The intake 16 is connected via piping (not shown) to a source of a fluid to be pumped. The discharge 17 is also connected to piping (not shown).

Figure 18:
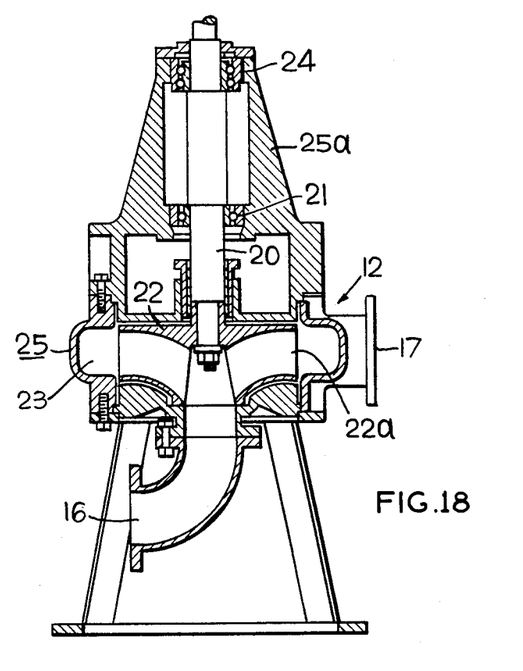
FIG. 18 is a longitudinal cross section of the pump of FIG. 1.

Pumps as described are well known and an example of such a pump may be Allis-Chalmers centrifugal pump type NSW-V model 250. As shown in FIG. 18, such a pump typically has a rotating shaft 20 journaled between two bearings. A first bearing 21 is located near an impeller 22 which is rotatably connected to shaft 20 for rotation within a volute 23 formed by a housing 25. A second bearing 24 is located at the top of a pump frame 25a. In operation, the motor 18 drives the line shaft 14 which in turn drives the pump shaft 20 and impeller 22 within the pump housing 25.

Figure 14:
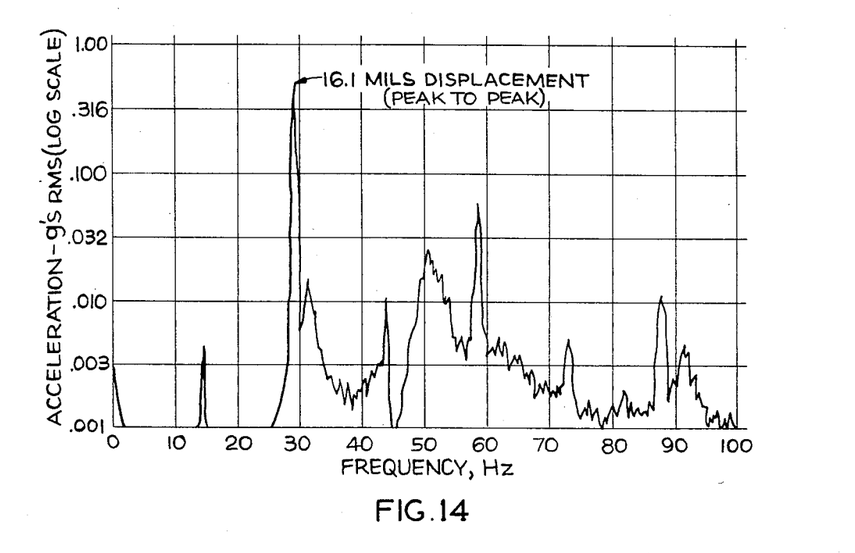
FIG. 14 is a graph derived from actual data showing a typical vibratory response of a pump without an absorber.

In a pump installation as shown in FIGS. 1 and 18, the relative motion of the impeller 22 within the housing 25 causes a broad band hydraulic excitation on the impeller 22 and shaft 20 when an impeller vane 22a passes the volute cut water near the discharge 17. Pumps with multiple vaned impellers will have a predominant periodic disturbing force at a frequency equal to the number of vanes times the operating speed. The operating speed of the model 250 pump is variable between 600 and 1200 rpm or 10 to 20 Hz. Therefore, a predominant periodic disturbing force on a two vane pump will be between 20 and 40 Hz. FIG. 14 shows the apparatus response when the disturbing force is at 29 Hz. In FIG. 14, the abscissa is frequency and the ordinate is the response of the pump installation (measured at the top bearing 24) expressed in terms of acceleration. In addition to experiencing a broad band hydraulic disturbing force, the pump may also be subjected to an unbalance force at an operating speed and a disturbing force at twice the running speed due to a universal joint in the line shafting 14. These forces which act upon the impeller 22 and shaft 20 can cause severe lateral vibration of the pump particularly when the frequency of the disturbing forces approaches a resonant frequency of the pump structure. Lateral vibration will take place at the upper bearing which is remotely connected to the foundation 10 via the pump housing and remotely connected to the upper foundation 11 through the shaft.

Figure 12A:
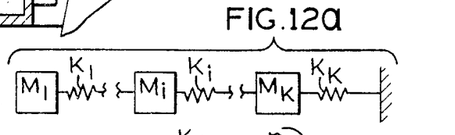
FIG. 12a is a multi-degree of freedom model of a pump installation.

The pump system's lateral vibratory response can be modeled as a multi-degree of freedom system of springs and masses as shown in FIG. 12a. The lateral response of the system is quite complex due to the different modes of vibration for each natural frequency of the pump system. The system response can be characterized by a system of linear differential equations in matrix rotation as follows:

$$[M]\{\ddot{x}\} + [K]\{x\} = \{F(t)\}$$

where
 [M] is the mass matrix;
 [K] is the stiffness matrix;
 $\{F(t)\}$ is the disturbing force vector;
 $\{\ddot{x}\}$ is the acceleration vector of selected points on the apparatus; and
 $\{x\}$ is the displacement vector at selected points on the apparatus corresponding to the elements in the $\{\ddot{x}\}$ vector.

Figure 12B:
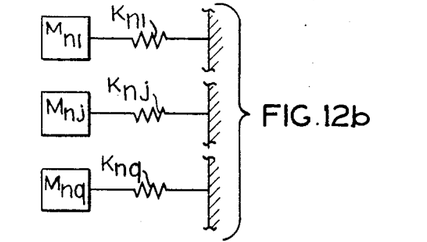
FIG. 12b is a multi-degree of freedom model of FIG. 12a showing the decoupled normal modes of the installation.

To determine the pump system modal parameters for each mode of vibration, the equation can be decoupled and solved as a plurality of single degree of freedom systems as modeled in FIG. 12b. This assumes the kinetic energy of the whole continuous structure represented by the discrete multi-mass and spring system is equal to the kinetic energy of the single degree of freedom systems at a resonance of interest. For instance, the modal mass at a resonance is:

$$M_{nj} = \sum_{i=1}^{K} M_i B_{i,nj}^2$$

where $M_{nj}$ is a modal mass for nj-th frequency;
$M_i$ is the apparatus discrete mass; and,
$B_{i,nj}$ is the mode displacement at a mass i for the nj-th resonant frequency. The elasticity for the resonance is:

$$K_{nj} = W_{nj}^2 M_{nj}$$

where:

$K_{nj}$ is the modal stiffness;
$M_{nj}$ is the modal mass; and,
$W_{nj}$ is the resonant frequency.

The pump system's lateral vibratory response can now be represented by "q" single degree of freedom systems. The response of the pump system at a specific frequency will be equal to the sum of the responses of the single degree of freedom systems.

The greatest displacement typically occurs when the disturbing forces acting on the shaft have a frequency approximately at natural frequency of the pump. When such a condition occurs, the vibration of the top bearing of the pump can be significant such as to cause structural or mechanical damage. The problem of reducing this vibration (i.e., attenuating the vibration) is increased because of the variable speed operation which will cause the disturbing force to coincide with several of the pump system's resonant frequencies.

To attenuate the lateral vibration of the pump, a vibration absorber 40 is provided. As shown more fully in FIGS. 2 and 3, the vibration absorber 40 includes a horizontal flange member 41 which is secured by means of a plurality of bolts 42 to the pump housing near the top bearing. Circumferentially spaced along an upper horizontal surface 43 of the flange member 41 are a plurality of elastic members 44. The elastic members 44 of FIGS. 2 and 3 are all elastomers and the description of one will suffice as the description of all. The elastomer 44 comprises a cylindrical silicon rubber elastomer 45 with a bottom end 45a and a top end 45b each provided with a steel dish 46a and 46b, respectively, molded thereto. A lowerthreaded stud 47a and an upper threaded stud 47b are welded to the lower plate 46a and upper plate 46b, respectively. The studs 47a and 47b are aligned with the cylindrical axis of the elastomer. The elastomers all have the same cylindrical height and are each located on the flange with the lower threaded studs 47a extending through holes 48 formed in the flange 41. A nut 49 and lock washer 50 received on the lower stud 47a secure the elastomer 44 to the flange 41. An annular mass 51 is placed on top of the elastomers 44. The mass 51 has a plurality of holes 52 formed therethrough which are aligned with the upper threaded studs 47b of the elastomers with the studs 47b extending through the mass 51 when the mass is placed on the elastomers 44. The mass 51 is secured to the elastomers 44 by means of a nut 53 and lock washer 54 received on the extending upper stud 47b. As can be seen from FIG. 2, the mass 51 is arranged concentric with the axis X—X of the shaft.

The elastomer as shown in the embodiment of FIG. 3 is made of silicon rubber which is characterized by having a spring stiffness (k) and a substantial damping coefficient (c). The size of the elastomers (their height and radius) are selected such that all of the elastomers have a combined stiffness $(K_a)$ and damping coefficient $(C_a)$ such that with a given inertia mass $(M_a)$ the absorber generates a periodic force conveniently referred to as a compensating force, which acts on the displaceable bearing out of phase with disturbing forces acting on the bearing. Accordingly, the absorber will attenuate displacement of the bearing.

It is desirable to tune the absorber to one of four conditions. By tuning, it is meant the elastomers and the inertia mass are preselected such that the stiffness $(Ka)$, damping coefficient $(Ca)$ and mass $(M_a)$ of the absorber cooperate for the absorber to generate a desired periodic compensating force in response to a given disturbing force. There are four conditions for which an absorber such as shown in FIGS. 2 and 3 can be tuned:

1. The absorber can be tuned to the frequency of the disturbing force;
2. A resonant frequency of the pump installation;
3. A frequency that attenuates the displacement within a frequency range; and
4. Two resonant frequencies of the pump installation.

Figure 11:
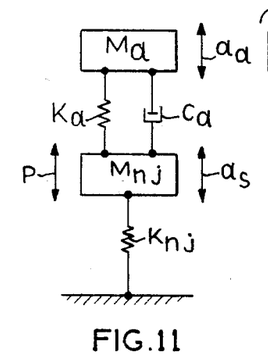
FIG. 11 is a vibratory model of a pump apparatus with an absorber.

To preselect the stiffness $(K_a)$, damping ratio $(C_a)$ and mass $(M_a)$ of the absorber to accomplish any of the above tuning, the pump and absorber can be mathematically modeled. An elementary model of the pump and absorber is shown in FIG. 11. The absorber consists of a mass $(M_a)$, spring $(K_a)$ and damper $(C_a)$. A structure disturbing force (P) having a frequency (w) is a harmonic component of the broad band hydraulic force. Complex displacements are shown for the absorber as $a_a$ and for the structure $a_s$. The pump system is represented by a modal mass $(M_{nj})$ and stiffness $(K_{nj})$ for a resonant frequency of interest (Wnj). The equations of motion for this model are:

$$a_a(g^2 - h^2 - i2L_a hg) + a_s(h^2 + i2L_a hg) = 0 \text{ and,}$$

$$a_a(M_r g^2) + a_s(g^2 - 1) = 31 P/K_s$$

where:
  $h = (K_r/M_r)^{\frac{1}{2}}$;
  $g = W/W_{nj}$;
  $L_a = C_a/2M_a W_a$;
  $W_{nj} = (K_s/M_s)^{\frac{1}{2}}$;
  $M_r = M_a/M_s$;
  $K_r = K_a/K_s$;
and,
  i is the complex operator.

The above equations can be solved to present the following as the forced harmonic response in dimensionless form:

$$A_s = (A + iB)/(C + iD)$$

where:
  $A = h^2 - g^2$;
  $B = 2 L_a hg$;
  $C = g^4 - [1 + h^2(1 + M_r)]g^2 + h^2$;
  $A_s = a_s/(P/K_s)$
and,
  $D = B [1 - g^2(1 + M_r)]$ To tune the absorber 40 to a disturbing force, the stiffness $(K_a)$, mass $(M_a)$ and damping coefficient $(C_a)$ of the absorber are preselected so the absorber has a frequency approximately equal to the frequency of the disturbing force. For the absorber to attain this frequency, the stiffness and mass of the absorber are selected to have a ratio determined by the following:
$K_a/M_a = (2\pi f_d)^{2'}$
where: $F_d$ is the frequency of the disturbing force.

When tuning to the frequency of the disturbing force, damping by the absorber is theoretically not desirable and the damping coefficient $(C_a)$ of the absorber is preferably less than the damping coefficient of the pump system.

While tuning to a disturbing force frequency is desirable for a pump system having one operating speed, this method of tuning does not effectively attenuate vibration for a pump system having a wide operating range with the pump having multiple resonances within the disturbing force range. In such cases, it is desirable to tune the absorber to a resonant frequency of the pump system. However, in selecting a stiffness ($K_a$) and mass ($M_a$) of the absorber sufficient to tune to a resonant frequency, the absorber must be provided with sufficient damping to attenuate vibrations when the pump is operated at a frequency off of the resonant frequency as well as at the resonant frequency. This method of tuning may be better understood by reference to FIGS. 19 and 20 which show mathematically derived responses of a two degree of freedom system representing the modal response of the apparatus with a damped dynamic absorber to a disturbing force having a given frequency. The graphs are nondimensional. The abscissas represent the ratio of the disturbing force frequency ($W_d$) to the natural frequency ($W_n$) and the ordinates represent the ratio of dynamic displacement ($d_d$) to static displacement ($d_s$). The dotted line of FIG. 19 (labeled "INFINITE DAMPING") shows the response of the system when the absorber has infinite damping. Comparatively, the dashed line (labeled "NO DAMPING") shows the response of a system with an absorber having no damping. The first solid line (labeled "A") and second solid line (labeled "B") show representative response curves for the system with two damping values between zero and infinity (such as damping coefficients of 0.1 and 0.32 respectively for a system having a mass ratio of 0.05).

Figure 19:
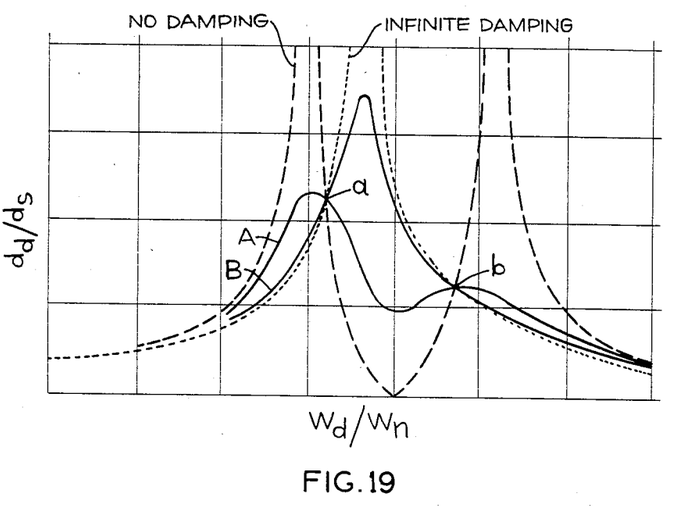
FIGS. 19 and 20 are nondimensional responses of a spring-mass system with an absorber.
Figure 20:
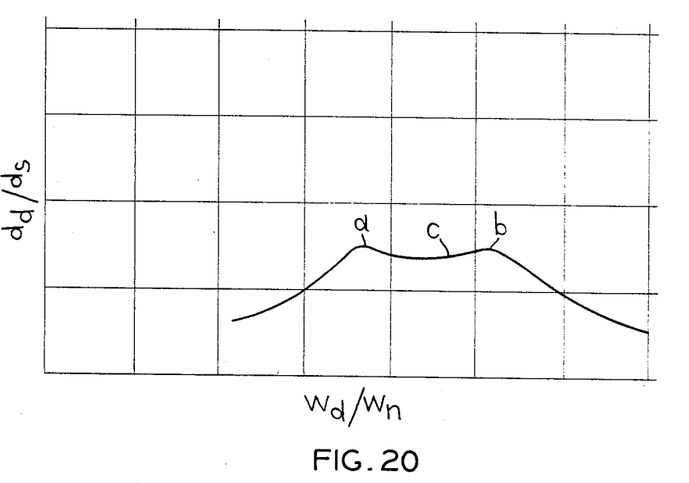

As is shown in FIG. 19, all curves pass through the points a and b regardless of the selected damping ratio. The points a and b may conveniently be referred to as invariant points. As is known to those skilled in the art, optimum tuning will occur by choosing a damping ratio and an absorber frequency such that the points a and b are reduced to the same level with the slope of the response curve through at least one of the points equal to zero. Such a response curve for an optimally tuned vibration absorber is shown in FIG. 20 as curve C.

To tune the absorber 40 in the manner described above, the damping coefficient ($Ca$), stiffness coefficient ($K_a$) and mass ($M_a$) of the absorber are selected such that the vibration at a resonance is attenuated. For the system as modeled in FIG. 11, the stiffness ($K_a$) required by all the elastomers may be determined from the following formula:

$$K_a = (2\pi f_a)^2 M_a$$

where:

$f_a = ff_s$ with $f_a$ being the resonant frequency of the absorber, $f_s$ being the resonant frequency of the pump system; and, $$f = (1+\mu)^{-1}$$

Figure 13:
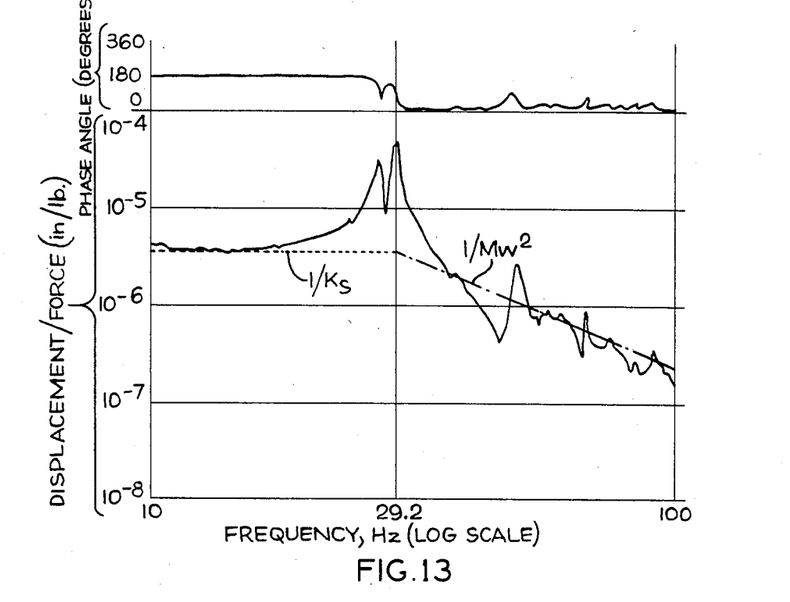
FIGS. 13 and 16 are typical transfer functions derived from actual test data from experiments performed on a pump apparatus such as that shown in FIG. 1.

In the above formula, the symbol $\mu$ equals the ratio of the mass of the absorber to the modal mass of the pump. The modal mass of an operating system such as the pump shown in FIG. 1 has been determined by an impact test. In an impact test, a dynamic force is applied against the top bearing and a plot is made having as its ordinate the displacement of the bearing divided by the force acting on the bearing (both in the frequency domain) and having as its abscissa frequency. Typical results of such an impact test are shown on FIG. 13. Since the displacement and the force are both vectors, the results of FIG. 13 are expressed both with a magnitude and with a phase angle. The upper portion of FIG. 13 indicates phase angles of the force with respect to the displacement and the lower portion of FIG. 13 is a transfer function indicating the magnitude of the displacement divided by the force. It will be noted the greatest displacement per unit force takes place at a resonant frequency of 29.2 Hz. With transfer function shown in FIG. 13, the modal mass and the spring coefficient of the pump can be determined. (The pump is assumed to have no damping which is a reasonable approximation of a structure such as the pump shown.)

The left-hand portion of the displacement curve of FIG. 13 approaches an asymptote indicated by the dotted line labeled $1/K_s$. It will be appreciated by those skilled in the art that the dotted line has an intersection with the ordinate at a value equal to the compliance (the reciprocal of the stiffness $K_s$) of the pump. For a particular pump as shown in FIG. 1, the transfer function of which appears in FIG. 13, the asymptote intersects the ordinate at a value of $3.1 \times 10^{-5}$ which results in a spring stiffness ($K_s$) of the pump equal to 28,575 lbs. per inch. On the right-hand portion of the graph of FIG. 13, a dot and dashed line appears which represents a least squares fit of the displacement curve to the right of the values corresponding to 29.2 Hz. It will be appreciated by those skilled in the art, the slope of the dot and dashed line equals the reciprocal of the product of the modal mass of the apparatus times the square of the corresponding frequency. Accordingly, with the dot and dashed line of FIG. 13, the modal mass of the pump can be determined for a resonant frequency. For tuning to attenuate the major resonant response, the modal mass at the peak resonance for the above example is 358 pounds.

With the spring stiffness determined as above, the absorber can be optimally dampened by preselecting a damping coefficient ($C_a$) so that the response function through one of the invariant points has zero slope. The optimum damping coefficient ($C_a$) is determined as follows:

$$C_a = 2M_a f_s L_a$$

where:

$M_a$ is the absorber mass $f_s$ is the pump system resonant frequency and $L_a$ is a damping ratio determined by $$L_a = ((3/8)[\mu/(1+\mu)^3])^{\frac{1}{2}}$$

where $\mu$ is the mass ratio discussed above.

For a typical pump system as shown in FIG. 1 and having the transfer function similar to FIG. 13, the elastomers 44 and inertia mass 51 can be selected as follows to tune the absorber to a resonant frequency with optimum damping. At the dominant resonant frequency of 27.9 Hz, the pump system has a modal mass of 358 lbs. and spring stiffness of 28,589 lbs./in. With a flange member 41 weight 48 lbs., the mass of the system is brought to 406 lbs. The mass of the inertia 51 is selected to be 41 lbs. to provide a mass ratio ($\mu$) of 0.10.

The frequency of the absorber is determined by $f_a = ff_s$ where $f = (1+\mu)^{-1} = 0.91$.

The frequency ($f_s$) is determined by $$f_s = (\tfrac{1}{2}\pi)[(K_s/M_s)^{\frac{1}{2}}]$$

where $K_s$ is the stiffness of the apparatus; and, $M_s$ is the mass of the apparatus including the flange 41.

Applying the above to the particular embodiment, $f_s=26.24$ Hz and $f_a=ff_s=23.88$ Hz.

With $f_a$ determined, the stiffness ($K_a$) of the absorber is determined by:

$K_a=(2\pi f_a)^2 M_a=2391$ lbs./in. for the particular embodiment.

The damping ratio ($L_a$) equals $(\frac{3}{8})[\mu/(1+\mu)^{-3}]$ or 0.168 for the particular embodiment. The damping coefficient ($C_a$) is determined as:

$C_a=2M_a f_s L_a=5.88$ lbs.—sec./in. for the particular embodiment.

Therefore, the absorber can be tuned to a resonance of the pump system and optimally tuned if the mass of the inertia is 41 lbs., the stiffness of all elastomers is 2391 lbs./in. and the damping coefficient of all elastomers is 5.88 lbs.—sec./in.

For rubber cylinders in shear, the cylinders have a storage and loss moduli as follows:

$K_s' = G'(A/t)$
$K_s'' = G''(A/t)$ where:

$K_s'$ = the cylinder storage modulus (lbs./in.)
$K_s''$ = the cylinder loss modulus (lbs./in.)
$G'$ = storage modulus of the rubber material (lbs./in.²)
$G''$ = loss modulus of the rubber material (lbs./in.²)
$A$ = cylinder cross-sectional area, (in.²)
$t$ = cylinder height, (in.)

If nine elastomers are provided on the absorber, the stiffness and storage modulus are as follows:

$K_s' = 2391/9 = 266$ lbs./in.

$G' = 124$ psi (for a cylinder having a height of 1.62 in. and a radius of 2.12 in.).

The loss modulus and loss coefficient (n) are:

$K_s''=cf_s=(5.88/9)(2\pi 26)=107$ lb./in. $n=K_s''/K_s'=107/266=.40$.

Accordingly, for the example given, the elastomers are preferably silicon rubber since the material can be formed to have a loss coefficient of 0.40.

For a pump equipped with an absorber determined from the above, the vibration of the pump was significantly reduced.

Figure 15:
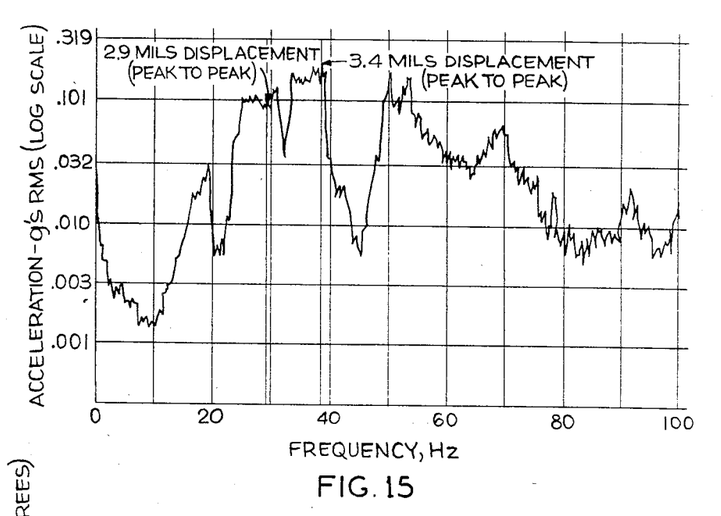
FIGS. 15 and 17 are graphs derived from actual data showing typical continuous sweep responses for a pump installation with an absorber.

FIG. 13 shows the resonances of the pump system to be at 29.2 Hz. When the disturbing force acts at 29.2 Hz, the displacement at the top bearing is 16.1 mils measured from peak to peak for the pump system without an absorber as shown in FIG. 14. FIG. 15 shows a continuous sweep response of a pump system with an absorber. As shown in FIG. 15, vibration at the top bearing of the pump is reduced to 2.9 mils peak to peak at resonance and 3.4 mils within the operating range.

The absorber can be tuned with a third tuning technique by tuning to a frequency that attenuates the vibratory displacement within a range by choosing the absorber frequency and damping to attenuate vibratory displacement at two closely spaced resonances within the operating range. By using one of several search algorithms, such as a gradient search, the vibratory response (d) for a frequency range can be minimized by the choice of a specific absorber frequency (mass and stiffness) and a specific absorber damping. In applying the algorithm, the response (d) is minimized subject to the following constraints:

a. A limit on the response as follows:

$(x_s/x_{st})(L_a,f,g_i) \leq d$ for $i=1, \ldots, n$ b. A limit on the relative motion of the absorber spring as follows:

$[x_a(L_a,f,g_i)-x_s(L_a,f,g_i)]/x_s \leq Q_{max}$ c. A range for the absorber damping:

$L_{min} < L_a < L_{max}$ d. A range for the absorber frequency:

$f_{min} < f < f_{max}$;

and, e. A frequency range of interest:

$a < g < b$ where:
$L_a = C_a/2w_s M_s$
$f = w_a/w_s$
$g = w/w_s$
$w_s = (K_{nl}/M_{nl})^{\frac{1}{2}}$
$w$ = disturbing force frequency.

Figure 16:
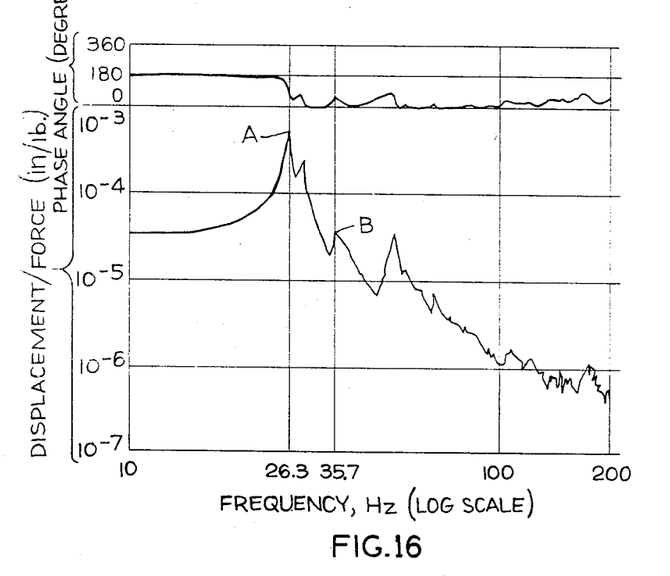
Figure 17:
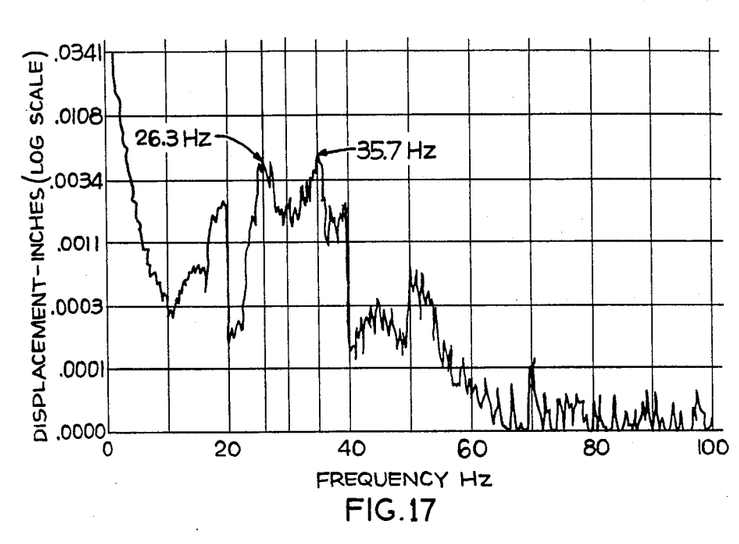

The absorber was tuned to reduce displacement at two closely spaced resonances according to the technique described above. FIG. 16 presents a transfer function showing two resonant frequencies at 26.3 Hz and 35.7 Hz labeled A and B, respectively. Tuning the absorber to attenuate vibration at both resonances resulting in nearly equal peaks as shown in the forced response continuous sweep of the operating range, FIG. 7.

Figures 4, 5:
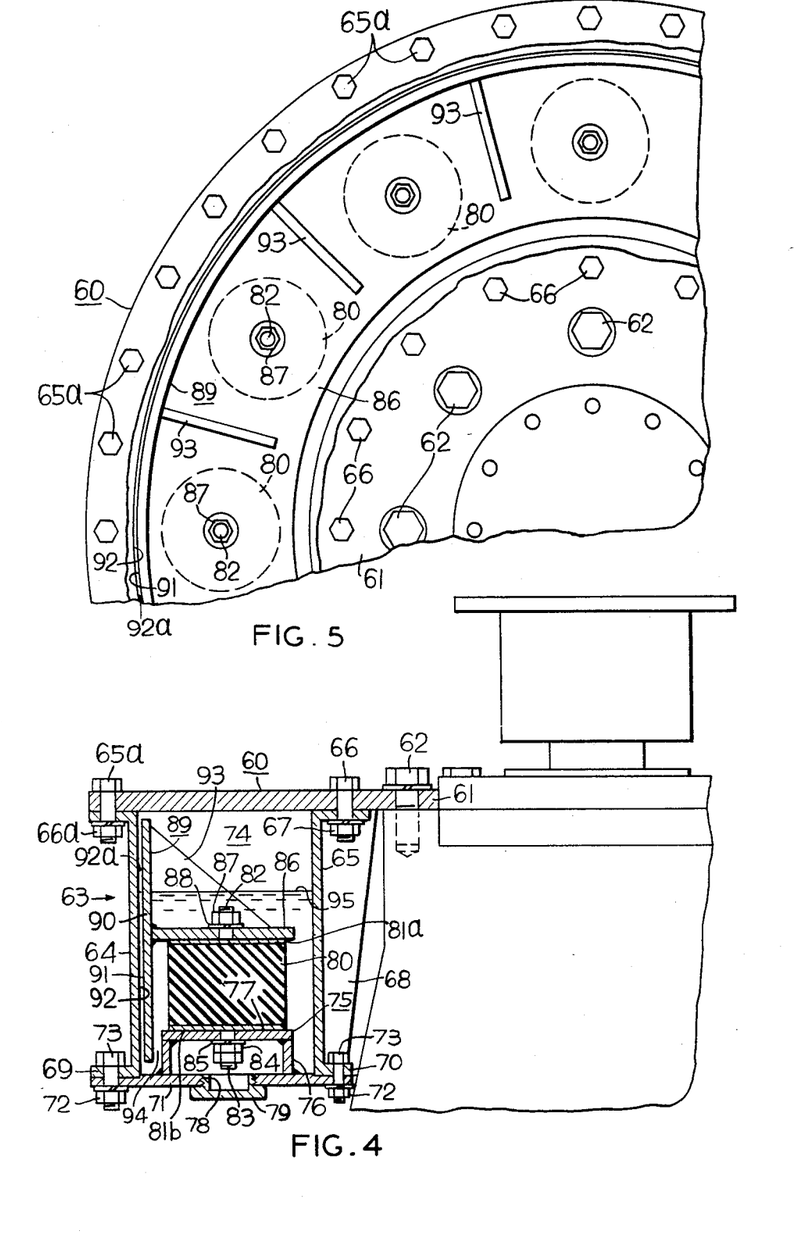
FIG. 4 is an elevation view, partially in section, of a vibration absorber secured to a pump in accordance with an alternative embodiment of the present invention.
FIG. 5 is a top plan view of the view of FIG. 4 partially cut away.

Referring now to FIGS. 4 and 5, an alternative embodiment of the present invention is shown. The pump is provided with a horizontal flange plate 60 having its inner periphery 61 secured to the pump housing by means of a plurality of bolts 62. The annular flange 60 is secured to the housing in the vicinity of the top bearing. An annular housing 63 is secured to the flange member and comprises a pair of concentric cylindrical walls 64, 65 with the outer wall 64 secured to the upper flange 60 by means of a plurality of bolts 65a and nuts 66a and the inner wall 65 is likewise secured to the annular flange 60 by means of bolts 66 and nuts 67. As shown in FIG. 4, the inner cylindrical wall 65 is provided with a plurality of circumferentially spaced supporting ribs 68 for stiffening the inner wall 65. The bottom of outer cylindrical wall 64 is provided with a flange 69 which is horizontally aligned with a flange 70 provided on the bottom of the inner wall 65. A bottom plate 71 is provided extending between the inner and outer walls and secured to the flanges 69, 70 by means of nuts 72 and bolts 73. The inner wall 65, outer wall 64 and bottom plate 71 cooperate to define a bounded volume 74 within the housing 63.

A plurality of platforms 75 are provided within the housing secured to the bottom plate 71 as shown in FIG. 4. The platforms 75 comprise a cylindrical member 76 and a top plate 77 extending between the top of the cylindrical member and bottom plate 71. An orifice 78 formed within the bottom plate 71 permits access from the exterior of the housing 63 to the top plate of the platforms. The orifice 78 is threaded and receives a threaded cap 79 which closes the bottom plate 71 of the housing 63.

Mounted on each of the platforms 75 is a cylindrical elastic member 80 preferably made of rubber having a low damping coefficient. The cylindrical rubber members 80 are provided a steel dish molded to both the top and bottom of the rubber member 80. An upper stud 82 is welded to the top steel dish 81a and a lower stud 83 is welded to the bottom steel dish 81b. The upper and lower studs are axially aligned with the cylindrical axis of member 80. The rubber members 80 are positioned on the cylindrical platforms with the lower threaded stud 83 extending through the mounting plate and secured thereto by a nut 84 and lock washer 85. An inertia mass 86 comprising an annular ring is disposed upon the upper surfaces of all of the cylindrical members and is secured to each of the cylindrical members by means of the upper threaded studs 82 extending through holes formed in the mass 86. A nut 87 and lock washer 88 secure the mass to the rubber member 80.

A squeeze film damper 89 is secured to the inertia mass 86 and comprises a cylindrical plate member 90 secured to an outer periphery of the inertia mass with the cylindrical plate member 90 having an outer vertical surface 91 parallel to an inner vertical surface 92 of the outer cylindrical wall 64 of the housing 63. The cylindrical plate member 90 is disposed with its outer surface 91 spaced from the inner surface 92 of the cylindrical wall 64 to provide a gap 92a between the wall of the housing and the surface of the squeeze film damping means. The cylindrical plate member 90 is rigidly braced by a plurality of upper and lower ribs 93 and 94, respectively, extending between the inertia mass 86 and the cylindrical plate 89. A lubricant, such as oil, is admitted into the housing 64 with the oil assuming a level 95 within the housing 63 and occupying at least a portion of the gap 92a.

As will be appreciated by those skilled in the art, the plate member 89, wall 64 and oil cooperate to form a squeeze film damper. As the pump and housing vibrate, the inertia mass 86 moves relative to the housing 63 by reason of the freedom of motion provided by the plurality of elastic members 80. As the inertia mass 86 moves relative to the housing 64, the cylindrical plate member 89 is constantly moving away from and toward the outer wall 64. This results in oil occupying the gap 92a to be displaced and replaced. Damping is generated by reason of the hydrodynamic forces generated when the surfaces have a perpendicular relative velocity component.

The amount of damping is dependent on the surface area, oil viscosity and gap size with the damping approximated as follows:

$$C = [SRL^3(2e^2+1)(\pi - \cos^{-1}e)]/[c^3(1-e^2)^{5/2}]$$

where:
S = oil viscosity;
R = gap radius;
L = submerged length;
e = eccentricity ratio of absorber and pump;
c = gap clearance; and
C = damping coefficient.

By varying the level of oil within the housing, the damping coefficient of the squeeze film damper can be adjusted such that the damping coefficient can be selected to tune the absorber as previously discussed. Likewise, by varying the number of rubber members 80 and varying their cylindrical diameter, length or storage modulus, the stiffness of the absorber can be varied.

Figure 6:
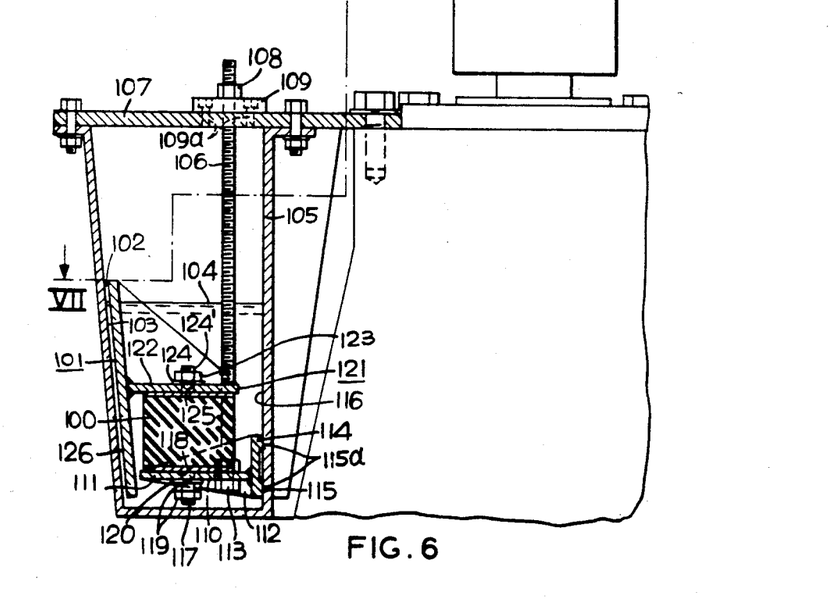
FIG. 6 is an elevation view, partially in section, of a third embodiment of the present invention.
Figure 7:
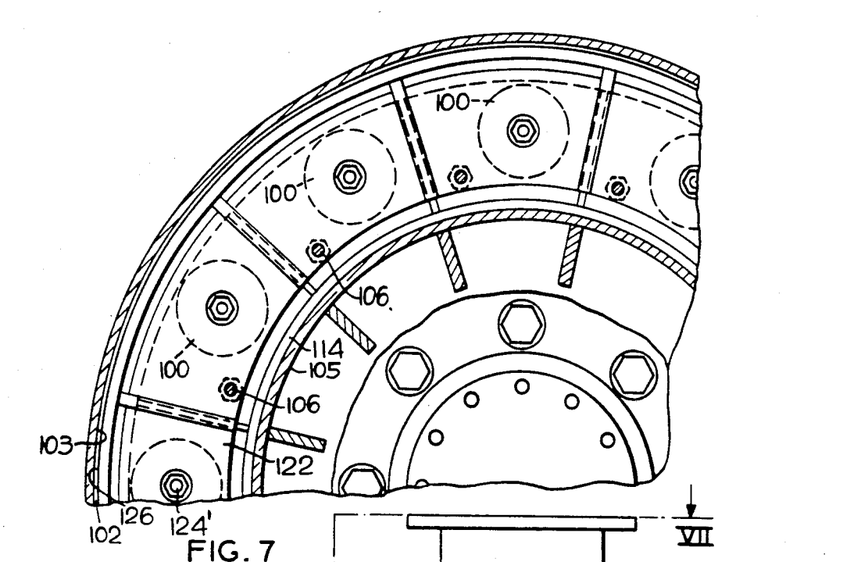
FIG. 7 is a view taken along line VII—VII of FIG. 6.

Referring to FIGS. 6 and 7, a third alternative of the present invention is shown which includes a rubber elastic member 100 having a predetermined stiffness and a low damping coefficient. In the embodiments shown in FIGS. 6 and 7, the damping of the absorber is provided by a squeeze film damper 101 similar to that shown in FIG. 4. However, in the embodiment of FIGS. 6 and 7, the damping coefficient can be adjusted by increasing a gap 102 between the outer wall 103 and the squeeze film damper as well as by adjusting the level 104 of oil within the housing.

In the embodiments shown in FIG. 6, the outer wall 103 of the housing is frusto-conical having its greatest diameter at the top of the housing and its lowest diameter at the bottom of the housing. The inner wall 105 of the housing is vertical. A plurality of threaded rods 106 are provided within the housing having their top portions rigidly secured to the annular flange 107 by means of a nut 108 and threaded washer 109. The rods 106 are vertically disposed with each rod 106 extending through an orifice 110 formed within a horizontal ring plate 111 of a support bracket 112. Support bracket 112 is secured to the rods 106 by means of nuts 113. The support bracket 112 is provided with vertical cylindrical support plate 114 rigidly secured to the horizontal ring 111.

As shown in FIG. 6, an inner cylindrical surface 115 of the support plate 114 is provided with lands 115a which slideably abut an outer cylindrical surface 116 of the inner wall 105 of the housing. Accordingly, the support bracket 112 is immobile relative to the housing.

A plurality of the elastic members 100 are circumferentially spaced upon the horizontal ring 111 and secured thereto by means of a lower threaded stud 117 extending through orifices 118 formed in the horizontal ring 111 with the studs and elastic member secured to the ring 111 by nuts 119 and lock washer 120.

The inertia mass 121, similar to that of the embodiment of FIG. 4, comprises a horizontal circular ring 122 secured to each of the elastic members 100 by means of nuts 123 and lock washers 124 engaging the upper threaded studs 124' extending through orifices 125 formed in the ring 122. The squeeze film damper 101 of FIG. 6 is similar to that of FIG. 4 except the damper has a frusto-conical outer vertical surface 126 parallel to the surface of the frusto-conical outer wall 103 of the housing. In the embodiment of FIG. 6, the support bracket 112 may be raised or lowered within the housing by turning the threaded washer 109 engaging the top of the threaded rod 106. As the support bracket 112 rises with the rod 106, the elastic member 100 rises within the housing with the corresponding increase in height of the squeeze film damper 101 and inertia mass 121. As the frusto-conical surface of the squeeze film damper 101 rises, the gap 102 between the squeeze film damper 101 and the outer wall 103 increases thereby resulting in an adjustment of the damping coefficient of the absorber. When the gap 102 is at a desired size, it is fixed by securing the threaded washer 109 to the flange 107 by screws 109a.

Figure 8:
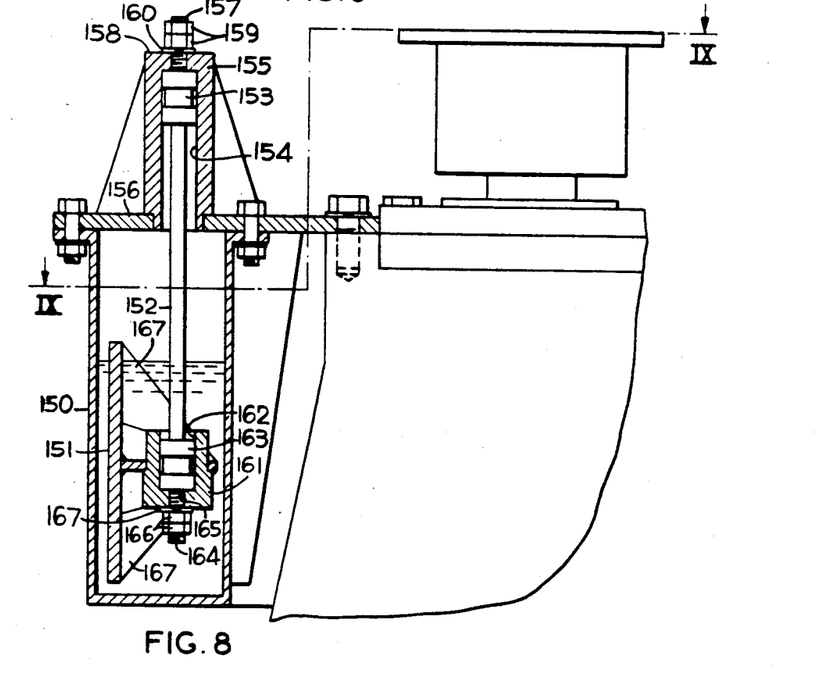
FIG. 8 is an elevation view, partially in section, of a fourth embodiment of the present invention.
Figure 9:
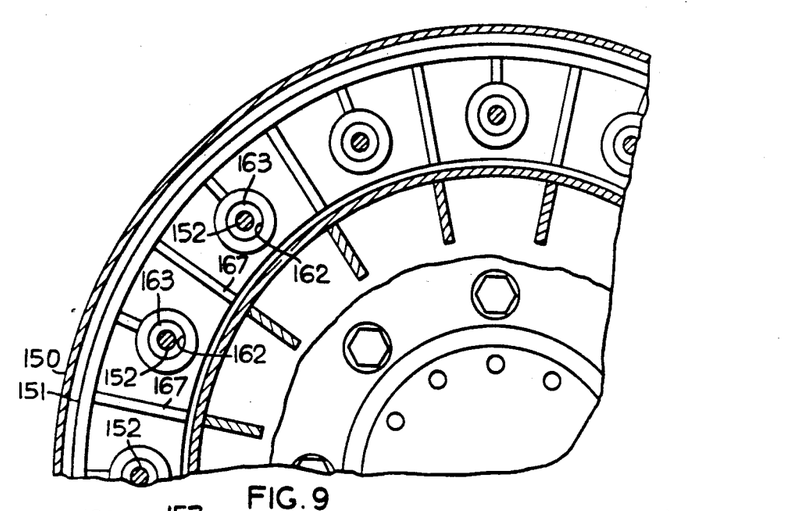
FIG. 9 is a view taken along line IX—IX of FIG. 8.

FIGS. 8 and 9 show an embodiment which is a modification of the embodiment shown in FIG. 4. In the embodiments of FIGS. 8 and 9, the housing has a vertical outer wall 150 and a vertical squeeze film damping surface. In the embodiments of FIGS. 8 and 9, the spring function of the absorber is performed by a steel spring rod 152 instead of the cylindrical elastic member 80 of FIG. 4. The stiffness (K) of the steel rod is:

$$K = 12EI/L_{sp}^3$$

where:
E = modulus of elasticity;
I = cross-sectional moment of inertia; and
$L_{sp}$ = length of the rod.

The steel spring rod 152 of FIG. 8 is circular in cross section and has an upper spool 153 received within a channel 154 formed by a cylindrical cap 155 secured to the annular flange 156 of the housing. A threaded stud 157 axially extending from the upper spool 153 of the steel spring rod 152 extends through a cap plate 158 of the cylindrical cap 155 and is secured thereto by means of nuts 159 and lock washer 160.

The inertia mass of the absorber of FIG. 8 comprises a circular steel body 161 having a plurality of bores 162 each sized and aligned to receive a lower spool 163 of the steel rod 152 with a bottom threaded stud 164 axially extending from the lower spool 163 through an orifice 165 formed within the inertia mass and secured thereto by means of nuts 166 and lock washer 167. The vertical cylindrical damping surface 151 of the embodiment of FIG. 8 is similar to that shown in the embodiment of FIG. 4 and is rigidly secured to the inertia mass by means of a plurality of rigid braces 167. The upper and lower spools 153 and 163 provide two bearing surfaces when the rod 152 vibrates thereby abating damage to the rod 152.

Figure 10:
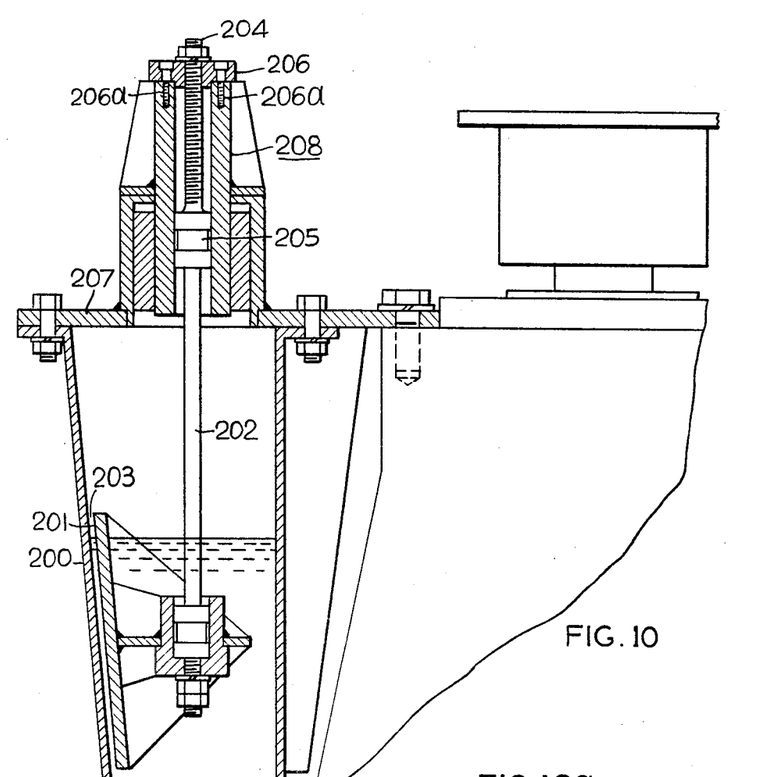
FIG. 10 is an elevation view, partially in section, of a fifth embodiment of the present invention.

In the embodiment of FIG. 10, the embodiment of FIG. 8 is modified to provide gap adjustment of the squeeze film damper. In FIG. 10, the outer wall 200 of the housing and the squeeze film damping surface 201 are both frusto-conical similar to the walls and damping surface of the embodiment shown in previously described FIG. 6. The spring rod 202 and the attached squeeze film damper may be raised or lowered (with resulting adjustment in the gap 203 between the squeeze film damper 201 and the outer wall 200) by means of extending the threaded stud 204 which axially extends from the upper spool 205 of the steel rod 202. With the threaded stud 204 extending through the upper threaded cap 206 of the cylindrical cover 208 secured to the angular flange 207, the steel spring rod 202 may be raised or lowered by means of turning the cap 206 at the top of the threaded stud 204 until a desired height is reached at which time the cap 206 is secured to the cover 208 by screws 206a.

Figure 21:
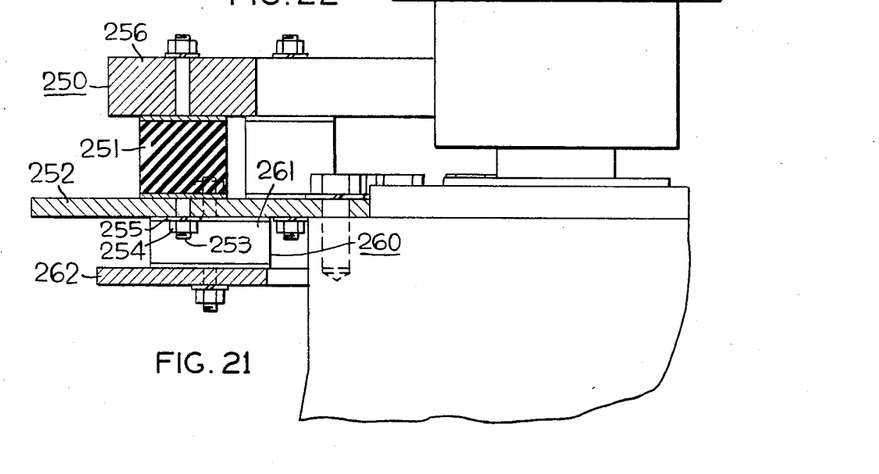
FIG. 21 is an elevation view, partially in section, of a sixth embodiment of the present invention.
Figure 22:
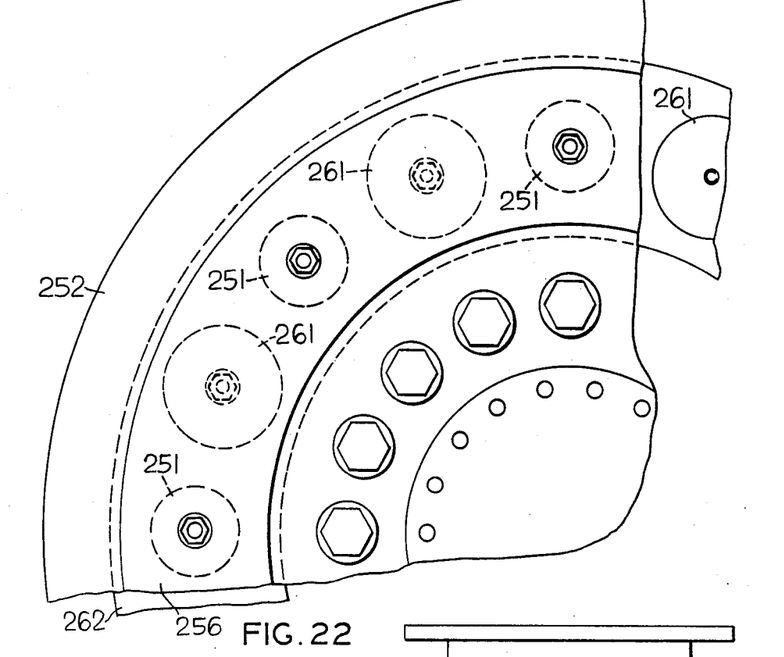
FIG. 22 is a top view of the vibration absorber and pump of FIG. 21.

In the embodiments of FIGS. 21 and 22, a modification of the embodiments previously discussed and shown in FIGS. 2 and 3 is provided. The embodiment of FIG. 21 is for a pump installation where it is desired to have the absorber tuned to two frequencies. This would be desirable in the case of a pump having multiple resonances within the disturbing force frequency range. The absorber of FIG. 21 includes an upper absorber 250 identical in form and function to the absorber 40 of FIGS. 2 and 3 with the upper absorber 250 having a plurality of elastomeric members 251 circumferentially spaced around the pump with their lower portion secured to an annular flange 252 by means of lower threaded studs 253 extending through the flange and secured thereto by nuts 254 and washers 255. The first inertia mass 256 is secured to each of the elastomers 251. The mass of the inertia 256 is preselected as are the damping coefficient and stiffness of the elastomers 251 such that the upper absorber 250 is tuned to one of the resonant frequencies.

A bottom absorber 260 is provided having a plurality of elastomeric members 261 having their upper portions secured to the annular flange 252 on the bottom side of the flange. The inertia mass 262 of the second absorber 260 is secured to the bottom of the elastomeric members 261 and depends from the elastomeric members by means of the lower threaded studs. The mass of the second inertia 262 and the stiffness and damping coefficient of the bottom absorber elastomeric members 261 are all preselected such that the bottom absorber is tuned to the second resonant frequency. In the representation of FIG. 21, the lower absorber 260 is tuned to a higher resonance than the upper absorber 250 as indicated by the lower height and bigger radius of the elastomers 261 and small mass of 262.

The method of tuning for a single absorber tuned to a single structural resonance can be applied to a dual absorber tuned for two resonances. This is accomplished by applying the optimum tuning method to the preselection of the mass, stiffness and damping for each absorber for the resonance for which each absorber will attenuate vibratory response. Also the tuning method used to attenuate vibration in a frequency range could be used here. In this case, a combination of parameters for the two absorbers is chosen to minimize the resonant responses in a frequency interval. A three-dimensional graph of response versus frequency and damping will yield a saddle point because the response will be minimum with respect to some variable and maximum with respect to others. A gradient search with quadratic convergence to the saddle point will yield the absorber parameters.

From the foregoing description of the present invention and its alternative embodiments, those skilled in the art will appreciate the present invention provides a damped dynamic vibration absorber which is readily tuneable to a desired frequency. Additionally, the absorbers as described are easily fabricated at low cost and require a relatively low mass to attenuate vibrations of the pump. Also, fine tuning of the absorbers is readily attainable. For example, the mass of the absorber can be easily reduced by trimming the inertia mass or can be increased by selectively adding reinforcing plates at desired locations along the inertia mass. In this latter approach, 24 mass sectors were fabricated. Each circular sector was sized to conform with the annular mass of the absorber. The weight of each sector was 1.3 lbs. which corresponded to roughly a ¼ Hz change in absorber natural frequency for each additional sector meaning the frequency could be varied over 6 Hz by adding or subtracting sectors. In the case of the elastomeric members, the damping coefficient and stiffness of the absorber can be adjusted by increasing or decreasing the number of elastomeric members as well as machining the outer cylindrical surface of the members. The elastomeric members having the added advantage that the stiffness and damping properties of the elastomer are the same in all directions due to the cylindrical nature of the elastomers.

The ease at which tuning can be varied and absorber fine tuned permits the absorber to be applicable to a wide variety of situations where the mass and elastomers are initially selected according to the predetermination techniques previously described for selecting the stiffness, damping ratio and mass. To the extent the absorber so selected is not fine tuned to the particular application, the mass, damping ratio and stiffness can be adjusted in the field.

From the foregoing detailed description of the present invention, it has been shown how the objects of the invention have been attained in a preferred manner. However, modification and equivalents of the disclosed concepts such as readily occur to those skilled in the art are intended to be included in the scope of this invention. Thus, the scope of the invention is intended to be limited only by the scope of the claims as are, or may hereafter be, appended hereto.

The embodiments of the invention in which an exclusive property of privilege is claimed are defined as follows:

1. A combination comprising:
    a pump installation having a pump comprising an impeller secured to a pump shaft for rotation about axis of rotation;
    a housing surrounding said impeller and having a fluid inlet and fluid outlet;
    a plurality of bearings carried by said housing with said pump shaft journaled within said bearings;
    means for connecting said housing to a foundation;
    said pump generating a disturbing force having a periodic component normal to said shaft at a frequency proportional to the rotational velocity of said shaft and generating a resultant periodic force normal to a portion of said pump with said portion experiencing a periodic lateral displacement relative to said foundation in response to said resultant force;
    a vibration absorber having a plurality of distinct elastic means secured to said pump for permitting lateral elastic movement of a portion of said elastic means relative to said pump;
    independent inertia means secured to said portion for lateral movement therewith;
    energy dissipative means for damping movement of said inertia means relative to said pump;
    said elastic means, inertia means and energy dissipative means each having, respectively, a preselected stiffness, mass and damping ratio sufficient for said absorber to generate a periodic compensation force acting on said portion out of phase with said disturbing force to attenuate the periodic displacement of said portion wherein said elastic means comprises a plurality of elastic members and means for rigidly securing said elastic members to said apparatus with said elastic members arranged around said apparatus in a plane generally normal to said axis of rotation,
    wherein said inertia means comprises an annular mass secured to each of said elastic members,
    wherein said energy dissipative means comprises a squeeze film damper.

2. In the combination according to claim 1 wherein said absorber includes a housing surrounding said apparatus and containing said annular mass; said housing having a first wall member; said annular mass having a surface opposing said wall member in spaced relation to define a gap between said wall member and said surface; a viscous liquid contained within said housing and at least partially filling said gap wherein said surface, wall member and liquid comprise said squeeze film damper and said damper having a damping coefficient adjustable by varying the level of liquid within said housing.

3. In the combination according to claim 2 wherein said elastic members comprise a plurality of elastomers having a portion rigidly connected to said apparatus.

4. In the combination according to claim 3 wherein said elastomers are generally cylindrical with a first end rigidly connected to said apparatus and with said annular mass secured to second end.

5. In the combination according to claim 4 wherein said elastomers are aligned with a circular cross section of said elastomers normal to said axis of rotation.

6. In the combination according to claim 5 comprising means for selectively adjusting the distance between said surface and wall member whereby said damping coefficient may be adjusted.

7. In the combination according to claim 6 comprising means for moving said elastomer along a fixed path; means for rigidly connecting said first end to said apparatus when said elastomer is at any of a plurality of points along said fixed path; said surface and said wall angled relative to said fixed path whereby said distance between said surface and wall member may be varied as said elastomer is moved along said fixed path.

8. In the combination according to claim 7 comprising a guide rod having one end secured to said housing and extending into said housing to a free end; a retaining bracket having means for receiving said rod permitting said bracket to be slideable along said rod; means for selectively securing said bracket in any of a plurality of points along said rod; said first end of said elastomer secured to said bracket; said housing having a second wall member generally parallel to said rod with said bracket abutting said second wall.

9. In the combination according to claim 2 wherein said elastic members comprise a plurality of spring steel rods having a first end rigidly connected to said apparatus and having a free end.

10. In the combination according to claim 9 wherein said rods are generally cylindrical with a circular cross section normal to said axis of rotation with said free end disposed within said housing and said annular mass secured to said free end.

11. In the combination according to claim 10 comprising means for selectively adjusting the distance between said surface and wall member.

12. In the combination according to claim 11 comprising means for removably securing said first end to said apparatus at any of a plurality of points along said first end with said rod axially displaced as said rod moves between said points; said surface and wall member angled relative to said rod.

13. In the combination according to claim 1 wherein said elastic members have a preselected stiffness and damping ratio and said inertia means have a preselected mass such that said absorber is tuned to said periodic disturbing force.

14. In the combination according to claim 13 wherein said elastic members, said inertia means and said energy dissipative means have said preselected stiffness, mass and damping ratio, respectively, for said absorber to have a frequency approximately equal to said frequency of said periodic disturbing force.

15. In the combination according to claim 14 wherein said stiffness of said elastic member and said mass of said inertia means are selected to have a ratio determined by the following:

$$(K_a/M_a) = (2\alpha f_d)^2$$

where:
    $K_a$ is the stiffness of the elastomer;
    $M_a$ is the mass of the inertia means; and
    $f_d$ is the frequency of the disturbing force.

16. In the combination according to claim 15 wherein said energy dissipative means has a damping ratio less than a damping ratio of said apparatus.

* * * * *